United States Patent
Dai et al.

(10) Patent No.: US 12,185,378 B2
(45) Date of Patent: Dec. 31, 2024

(54) SYSTEMS AND METHODS OF ENHANCED RANDOM ACCESS PROCEDURE USING INFORMATION ELEMENT CONTAINING CONFIGURED PARAMETERS

(71) Applicant: ZTE CORPORATION, Guangdong (CN)

(72) Inventors: Jianqiang Dai, Shenzhen (CN); Li Tian, Shenzhen (CN); Junfeng Zhang, Shenzhen (CN); Yuzhou Hu, Shenzhen (CN); Ziyang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 340 days.

(21) Appl. No.: 17/589,268

(22) Filed: Jan. 31, 2022

(65) Prior Publication Data

US 2022/0159734 A1 May 19, 2022

Related U.S. Application Data

(63) Continuation of application No. PCT/CN2019/098855, filed on Aug. 1, 2019.

(51) Int. Cl.
  *H04W 74/08* (2024.01)
  *H04L 5/00* (2006.01)
  *H04W 74/00* (2009.01)
  *H04W 74/0833* (2024.01)

(52) U.S. Cl.
  CPC ....... *H04W 74/0833* (2013.01); *H04L 5/0005* (2013.01); *H04L 5/0044* (2013.01); *H04L 5/0051* (2013.01); *H04W 74/006* (2013.01)

(58) Field of Classification Search
  CPC ........... H04W 74/0833; H04W 74/006; H04W 72/0446; H04W 72/0453; H04W 72/23;
  (Continued)

(56) References Cited

U.S. PATENT DOCUMENTS

2014/0064067 A1* 3/2014 Drewes ................ H04L 5/0044
                                                               370/329
2016/0174237 A1   6/2016 Zhao et al.
(Continued)

FOREIGN PATENT DOCUMENTS

CN    109863817 A    6/2019
CN    110024468 A    7/2019
(Continued)

OTHER PUBLICATIONS

Extended European Search Report for EP Appl. No. 19939208.5, dated Jul. 8, 2022 (12 pages).
(Continued)

*Primary Examiner* — Kiet Tang
(74) *Attorney, Agent, or Firm* — Foley & Lardner LLP

(57) ABSTRACT

In one embodiment, a method performed by a wireless communication node includes transmitting a first information element that includes a plurality of parameters. The plurality of parameters is configured for a plurality of wireless communication devices to perform respective random access procedures. The method includes transmitting a second information element that includes a subset of the plurality of parameters. The subset of parameters is configured for one of the plurality of wireless communication devices to perform one of the random access procedures.

14 Claims, 10 Drawing Sheets

(58) Field of Classification Search
CPC .. H04W 74/004; H04L 5/0005; H04L 5/0044; H04L 5/0051; H04L 5/0053; H04L 1/1893; H04L 1/1896
See application file for complete search history.

(56) References Cited

U.S. PATENT DOCUMENTS

| | | | |
|---|---|---|---|
| 2017/0019930 A1* | 1/2017 | Lee | H04W 72/21 |
| 2018/0054837 A1 | 2/2018 | Islam et al. | |
| 2019/0116613 A1 | 4/2019 | Abedini et al. | |
| 2020/0053798 A1* | 2/2020 | Tsai | H04W 72/23 |
| 2020/0120713 A1* | 4/2020 | Yerramalli | H04W 52/50 |

FOREIGN PATENT DOCUMENTS

| | | |
|---|---|---|
| KR | 10-2014-0105037 A | 8/2014 |
| RU | 2411656 C2 | 2/2011 |
| WO | WO-2015/016754 A1 | 2/2015 |
| WO | WO-2015/027437 A1 | 3/2015 |
| WO | WO-2016/134760 A1 | 9/2016 |
| WO | WO-2020/201142 A1 | 10/2020 |

OTHER PUBLICATIONS

Zte Corporation et al., "Consideration on 2-step RACH procedure" 3GPP TSG-WG2 Meeting #105-bis, R2-1903549, Apr. 12, 2019, Xian, China (11 pages).

3GPP TS 38.331 V15.6.0 (Jun. 2019), 3rd Generation Partnership Project; Technical Specification Group Radio Access Network; NR; Radio Resource Control (RRC) protocol specification (Release 15).

Office Action for TW Appl. No. 109125849 dated Dec. 29, 2023 (with English translation, 19 pages).

International Search Report and Written Opinion for PCT App. No. PCT/CN2019/098855 dtd Apr. 24, 2020.

LG Electronics Discussion on Channel Structure for 2-step RACH 3GPP TSG RAN WGI Meeting #97 RI-1906717 May 17, 2019(May 17, 2019) the whole document.

LG Electronics Inc. General 2-step RACH procedure 3GPP TSG-RAN WG2 Meeting #106 R2-1906555 May 17, 2019(May 17, 2019) section 2.

SONY Considerations on Channel Structure for Two-step Rach 3GPP TSG RAN WGI Meeting #97 RI-1906848 May 17, 2019(May 17, 2019) section 2.

First Office Action for RU Appl. 2022105299, dated Oct. 6, 2022 (with English translation, 13 pages).

First Office Action for CN Appl. No. 201980099075.0, dated Jul. 4, 2024 (with English translation, 12 pages).

Sony, "Considerations on Channel Structure for Two-Step Rach", 3GPP TSG RAN WG1 Meeting #97, R1-1906848, May 17, 2019, Reno, USA (4 pages).

Office Action for KR Appl. No. 10-2022-7006765 dated Oct. 16, 2024 (with English translation, 8 pages, received Oct. 24, 2024).

ZTE, "Summary of 7.2.1.1 Channel Structure for Two-step RACH", 3GPP TSG RAN WG1 #97, R1-1907673, May 17, 2019, Reno, USA (62 pages).

* cited by examiner

SYSTEMS AND METHODS OF ENHANCED RANDOM ACCESS PROCEDURE USING INFORMATION ELEMENT CONTAINING CONFIGURED PARAMETERS

CROSS-REFERENCE TO RELATED APPLICATION

This application claims the benefit of priority under 35 U.S.C. § 120 as a continuation of PCT Patent Application No. PCT/CN2019/098855, filed on Aug. 1, 2019, the disclosure of which is incorporated herein by reference in its entirety.

TECHNICAL FIELD

The disclosure relates generally to wireless communications and, more particularly, to systems and methods for enhanced random access procedure.

BACKGROUND

In the 5th Generation (5G) New Radio (NR) mobile networks, before a user equipment (UE) can send data to a base station (BS), the UE is required to obtain uplink synchronization and downlink synchronization with the BS. The uplink timing synchronization can be achieved by performing a random access procedure. To meet the demand for faster and efficient communications, the random access procedure is to be enhanced.

SUMMARY

The example embodiments disclosed herein are directed to solving the issues relating to one or more of the existing problems, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes transmitting a first information element that includes a plurality of parameters. The plurality of parameters is configured for a plurality of wireless communication devices to perform respective random access procedures. The method includes transmitting a second information element that includes a subset of the plurality of parameters. The subset of parameters is configured for one of the plurality of wireless communication devices to perform one of the random access procedures.

In some embodiments, the plurality of parameters in the first information element is further commonly configured for each of the plurality of wireless communication devices to transmit one or more messages, that include a preamble and a payload, to the wireless communication node in the random access procedure.

In some embodiments, the subset of parameters in the second information element is further dedicatedly configured for the wireless communication device to transmit the one or more messages to the wireless communication node in the random access procedure.

In another embodiment, a method performed by a wireless communication device includes receiving, from a wireless communication node, a first information element that includes a plurality of parameters. The plurality of parameters is configured for a plurality of wireless communication devices to perform respective random access procedures. The method includes receiving, from the wireless communication node, a second information element that includes a subset of the plurality of parameters. The subset of parameters is configured for the wireless communication device to perform one of the random access procedures.

In some embodiments, the plurality of parameters in the first information element is further commonly configured for each of the plurality of wireless communication devices to transmit one or more messages, that include a preamble and a payload, to the wireless communication node in the random access procedure.

In some embodiments, the subset of parameters in the second information element is further dedicatedly configured for the wireless communication device to transmit the one or more messages to the wireless communication node in the random access procedure.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
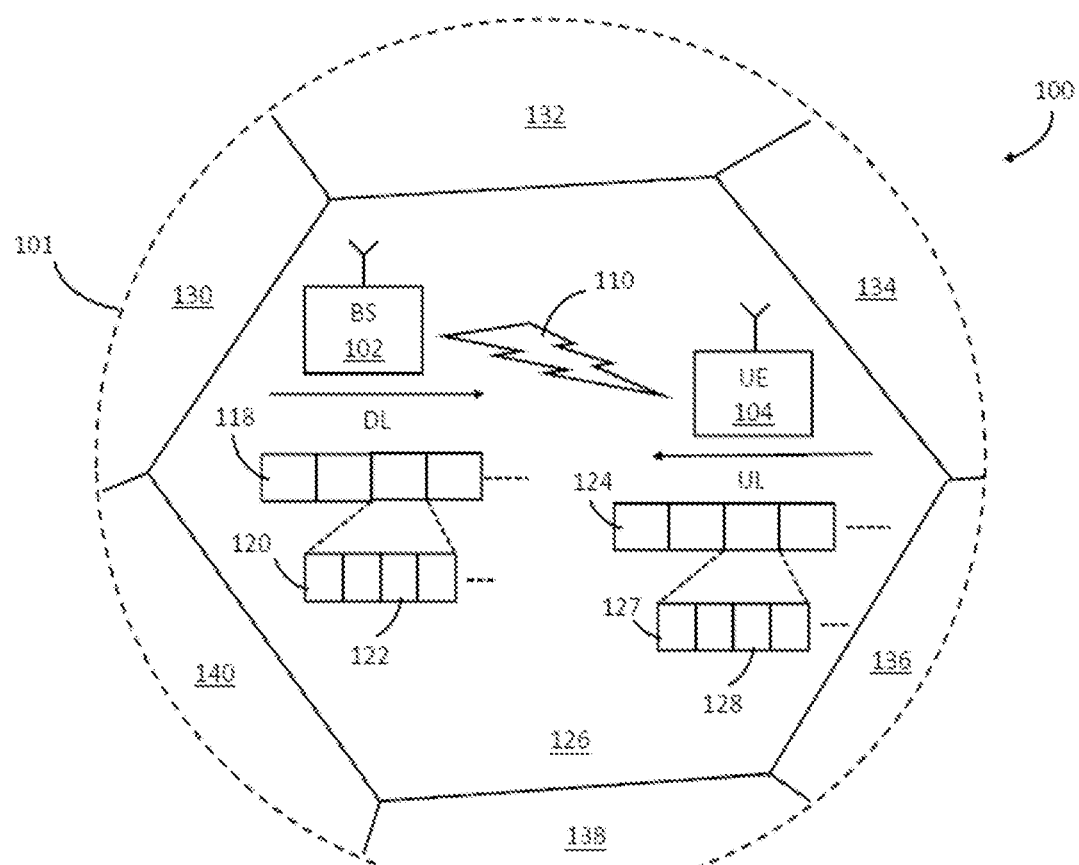
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are respectively described herein as non-limiting examples of "communication node" (or "wireless communication node") and "communication device" (or "wireless communication device") generally, which can practice the methods disclosed herein. Such communication nodes and devices may be capable of wireless and/or wired communications, in accordance with various embodiments of the present solution.

Figure 2:
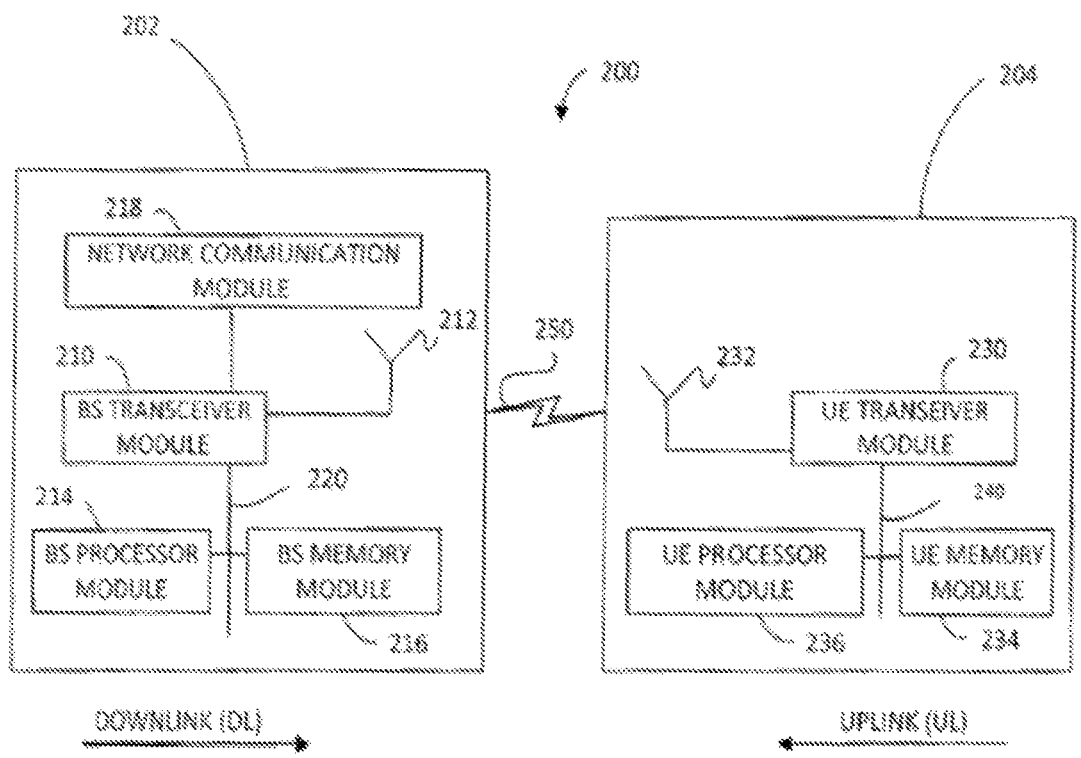
FIG. 2 illustrates block diagrams of an example base station and an example user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a next generation nodeB (gNodeB or gNB), an evolved node B (eNB), a serving eNB, a target eNB, a femto station, a pico station, or a Transmission Reception Point (TRP), for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a process, method, or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Example Random Access Procedures

An example 2-step random access procedure includes at least one of a transmission of one or more of a message A (msgA) and a transmission of one or more of a message B (msgB). In some embodiments of the present disclosure, the network configures parameters for the one or more msgA transmissions by system information (SI). In some embodiments, the network configures the parameters, such as an uplink transmission resource allocation, a modulation and coding scheme (MCS), and a transport block size (TBS), among others, in advance. The configuration information (e.g. the parameters) can be conveyed in the SI. In some embodiments, an information element (IE) contains the parameters.

The UE can transmit a number of bits as uplink (UL) data transmission. The number of bits can be 200, 400, 800, or 1600, among others. Thus, the required resource can be different. Since the resource is preserved by SI (e.g. it is unchanged during a period of time), it may be waste of resources if a large block of resources was still preserved when the UE changed the number of bits from 1600 bits to 200 bits. In contrast, the preserved resource may be insufficient if a larger size payload was requested. Thus, flexible resource allocation mechanism is needed/used in order to improve the utility and/or efficiency of resource usage.

Figure 3:
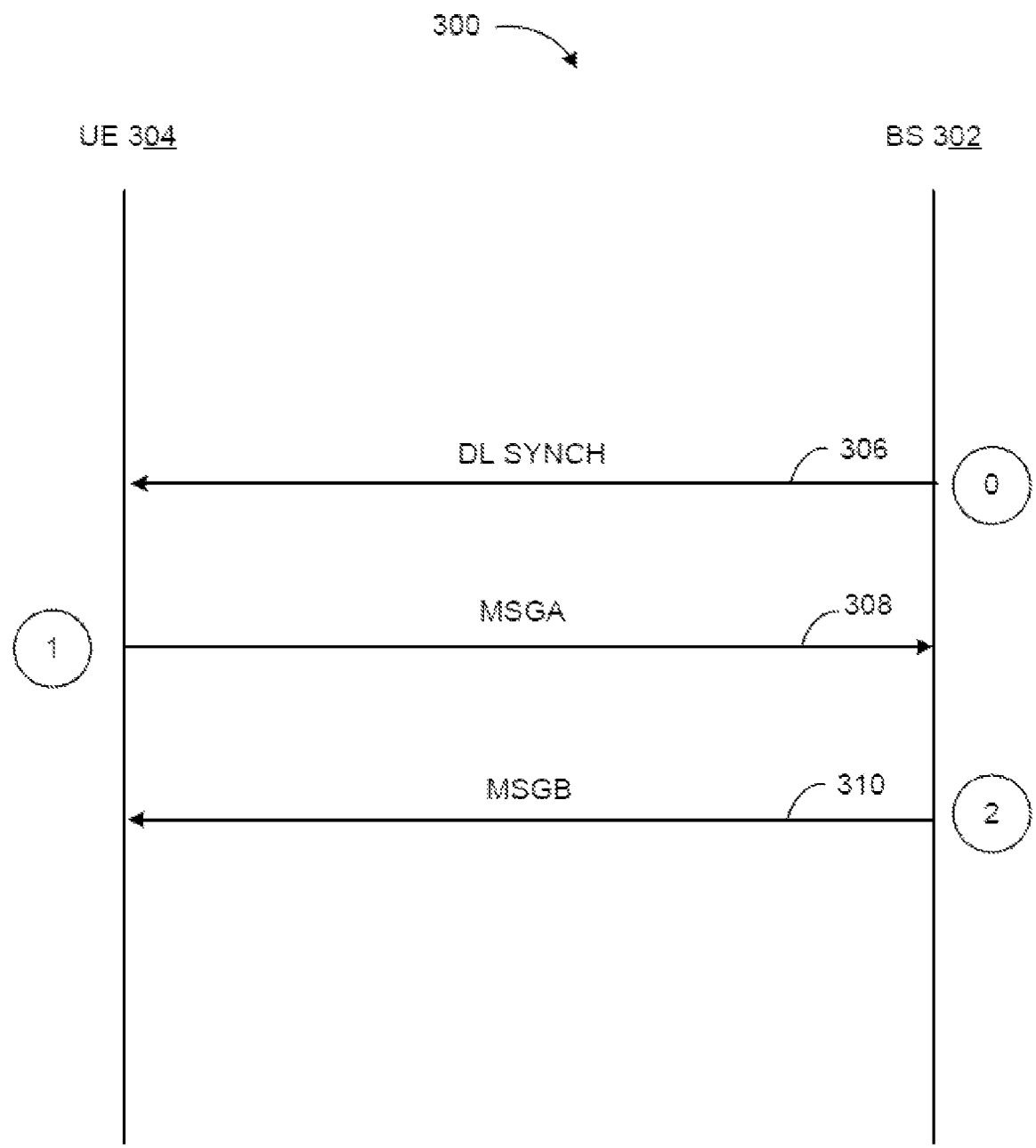
FIG. 3 illustrates an example 2-step random access procedure, in accordance with some embodiments of the present disclosure.

FIG. 3 illustrates an example 2-step random access procedure 300, in accordance with some embodiments of the present disclosure. The 2-step random access channel (RACH) is a way to reduce the procedure for lower random access (RA) latency and downlink signaling overhead. In some embodiments, it finishes the random access procedure by a 2-step procedure (e.g. two transmissions including a msgA uplink transmission and a msgB downlink transmission). The 2-step RA procedure and corresponding 2-step RACH can be used for several purposes, including for initial access when establishing a radio link (e.g. moving from radio resource control IDLE (RRC IDLE) or RRC INACTIVE to RRC CONNECTED), for handover when uplink synchronization is to be established to the new cell, or to establish uplink synchronization if uplink or downlink data arrives when the terminal is in RRC CONNECTED and the uplink is not synchronized.

Referring to FIG. 3, the 2-step random access procedure 300 is performed between a BS 302 (e.g., a gNB, a gNodeB, the BS 102, and/or the BS 202) and a UE 304 (e.g. a device, a mobile device, the UE 104, and/or the UE 204). In some embodiments, before the 2-step random access procedure 300, at Step 0 (306), the BS 302 transmits a downlink (DL) synchronization (synch) to the UE 304. In some embodiments, the DL synch transmission is a cell search, a downlink synchronization, and/or a system information block, among others. In some embodiments, the DL synch transmission includes one or more transmissions of the IEs for configuring the parameters associated with the transmission of the one or more of the msgA.

Figure 4:
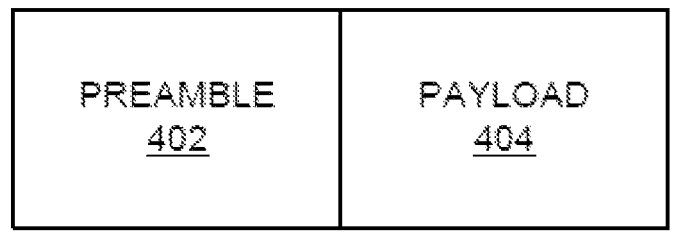
FIG. 4 illustrates an example message during a random access procedure, in accordance with some embodiments of the present disclosure.

In some embodiments, at Step 1 (308) of the 2-step random access procedure 300, the UE 304 transmits the one or more of the msgA. In some embodiments, the preamble 402 (as shown in FIG. 4) is optional. In some embodiments, the time-frequency resource on which the one or more of the msgA are transmitted is the physical random-access channel (PRACH), the uplink shared channel (ULSCH), or the physical uplink shared channel (PUSCH).

FIG. 4 illustrates an example message during a random access procedure, in accordance with some embodiments of the present disclosure. Referring now to FIG. 4, a msgA 400 includes a preamble 402 and a data payload 404 to a BS 302 for access to the BS 302. In some embodiments, the payload 404 is optional.

Referring back to FIG. 3, at step 2 (310), the BS 302 transmits one or more of the msgB as a response to the one or more of the msgA (e.g. the msgA 400) to the UE 304. In some embodiments, the time-frequency resource on which the msgB is transmitted is the downlink shared channel (DLSCH) or the physical downlink control channel (PDCCH). In some embodiments, the UE 304 monitors L1/L2 control channels for the one or more msgB transmissions within a predetermined time window. Responsive to not receiving at least one of the one or more msgB transmissions within the time window, the attempt may be declared as failed and the procedure will repeat.

In some embodiments, a wireless communication node (e.g. the BS 302) transmits, to a plurality of wireless devices (e.g. multiple UEs 304), a first IE that includes a plurality of parameters. In some embodiments, the plurality of parameters is configured for the plurality of wireless communication devices to perform respective random access procedures. In some embodiments, the wireless communication node transmits, to a wireless device (e.g. the UE 304), a second IE that includes a subset of the plurality of parameters. In some embodiments, the subset of parameters is configured for the wireless device to perform a random access procedure. Performing the random access procedure can include initiating and/or updating the random access procedure (e.g. initiating or updating the parameters that configure the msgA and/or msgB transmission). The random access procedure may include the 2-step random access procedure.

In general a RACH-ConfigCommon IE is used to specify the cell specific random-access parameters, and a RACH-ConfigDedicated IE is used to specify dedicated random access parameters. The RACH-ConfigDedicated IE can contain parameters such as contention free random access (CFRA) occasions and CFRA synchronization signal block (SSB) resources. In some embodiments of the present disclosure, for the msgA payload transmission, a 2-stepRACH-ConfigCommon IE is used to specify the cell specific random-access parameters and a 2-stepRACH-ConfigDedicated IE is used to specify dedicated random access parameters.

In some embodiments, the plurality of parameters in the first IE (e.g. the 2-stepRACH-ConfigCommon IE) is further commonly configured for each of the plurality of wireless communication devices to transmit one or more messages (e.g. the one or more of the msgA) to the wireless communication node in the random access procedure. The one or more messages can include a preamble and a payload. The BS 302 can transmit (e.g., broadcast) the first IE to all of the UEs in a cell defined by the BS 302. In some embodiments, the subset of parameters in the second IE (e.g. the 2-stepRACH-ConfigDedicated IE) is further dedicatedly configured for the wireless communication device to transmit the one or more messages to the wireless communication node in the random access procedure. The BS 302 can transmit the second IE to a specific UE. A PUSCH occasion can be configured for the UEs to transmit information (e.g., UE ID, data, UCI, CSI, etc.) over a msgA PUSCH. The PUSCH occasion is herein referred to as a PO.

In some embodiments of the present disclosure, for the one or more of the msgA payload transmission, a 2-stepRACH-ConfigCommon IE is used to specify the cell specific random-access parameters and a 2-stepRACH-ConfigDedicated IE is used to specify dedicated random access parameters. In one embodiment, the 2-stepRACH-ConfigCommon IE contains at least one of the following parameters: a number of configurations; a modulation coding scheme (MCS); a transport block size (TBS); a physical uplink shared channel (PUSCH) mapping type; a number of frequency division multiplexed (FDMed) PUSCH occasions (POs); a number of physical resource blocks (PRBs) per PO; a frequency starting point; a number of demodulation reference signal (DMRS) symbols/ports/sequences per PO; a bandwidth of a PRB-level guard band or duration of a guard time; a periodicity of a msgA PUSCH configuration period; Offset(s) (e.g., symbol level and/or slot level, among others); a starting symbol and a number of time-domain POs in a slot for a msgA transmission; a number of symbols per PO; a number of time division multiplexed (TDMed) POs; and a redundancy version. In some embodiments, the redundancy version is a field that indicates a redundancy version of a code word (e.g. for turbo encoding).

In one embodiment, the 2-stepRACH-ConfigDedicated IE contains the MCS. In one embodiment, the MCS is defined to inform a MCS index, a modulation order, a code rate. In one embodiment, the 2-stepRACH-ConfigDedicated IE contains the TBS. In one embodiment, the TBS is defined to inform TBS information. The TBS information can include the size, whether the TBS into multiple codeblocks, and the number and the size of the multiple codeblocks. In one embodiment, the 2-stepRACH-ConfigDedicated IE contains a "MCS and TBS" parameter. In one embodiment, the "TBS and MCS" parameter is defined to inform the TBS information and the MCS index. In some embodiments, the 2-stepRACH-ConfigDedicated IE contains one or more of the parameters contained in the 2-stepRACH-ConfigCommon IE. The 2-stepRACH-ConfigDedicated IE can be used to overwrite, replace, encode, decode, embed, or otherwise update the configurations that were configured by the parameters of the 2-stepRACH-ConfigCommon IE.

In one embodiment, the 2-stepRACH-ConfigDedicated IE contains the number of PRBs per PO, common resource blocks (CRBs) per PO, and/or virtual resource blocks (VRBs) per PO. In one embodiment, the number of PRBs per PO is defined to inform the number of PRBs per PO for the POs configured by a configuration. In one embodiment, the number of PRBs per PO is defined to inform the max number of PRBs per PO among multiple UEs. In some embodiments, the 2-stepRACH-ConfigDedicated IE contains a mapping from the number of VRBs per PO to the number of PRBs per PO.

Figure 5:
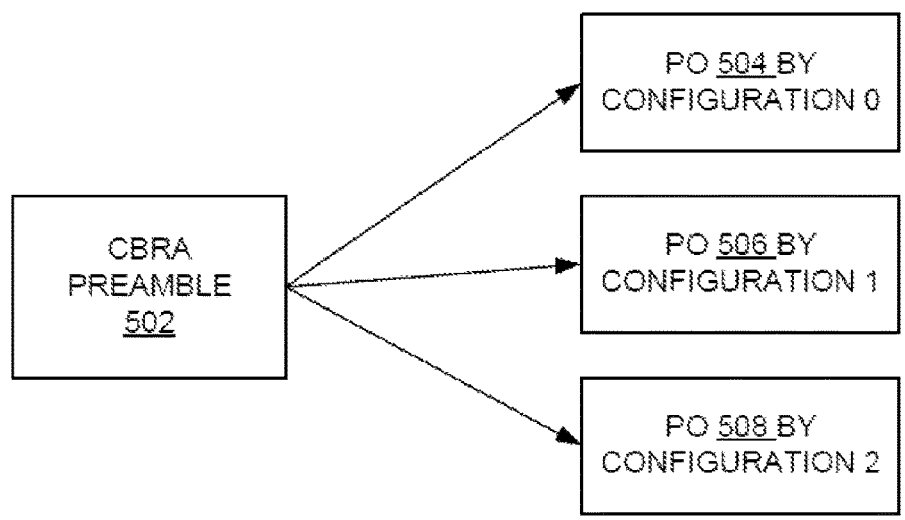
FIG. 5 illustrates an example mapping between a preamble and one or more POs, in accordance with some embodiments of the present disclosure.

FIG. 5 illustrates an example mapping 500 between a preamble and one or more POs, in accordance with some embodiments of the present disclosure. Referring now to FIG. 5, in one embodiment, the UE 304 is configured to transmit, as at least a portion of the msgA, a contention based random access (CBRA) preamble 502 (e.g. the preamble 402) and a CBRA payload (e.g. the data payload 404). In some embodiments, one or more POs can be used to transmit the CBRA payload. In one embodiment, each of the one or more POs is configured by one of three configurations (e.g. PO 504 is configured by configuration 0, PO 506 is configured by configuration 1, and PO 508 is configured by the configuration 2). In some embodiments, the UE 304 selects one or more of the POs 504-508 to transmit the CBRA payload. The selected one or more POs are mapped, linked, or otherwise coupled to the CBRA preamble 502. In one embodiment, each of the configurations 0-2 is associated with a respective combination of the parameters included in the 2-stepRACH-ConfigCommon IE (e.g. the first IE). In one embodiment, one of the configurations (e.g., configuration 2) is associated with a combination of the parameters included in the 2-stepRACH-ConfigDedicated IE (e.g. the second IE). The parameters included in the 2-stepRACH-ConfigDedicated IE can be a subset of the parameters included in the 2-stepRACH-ConfigCommon IE, but with different values. Thus, the 2-stepRACH-ConfigDedicated IE can be used to replace, overwrite, encode, decode, embed, or otherwise update some parameters initially configured by the 2-stepRACH-ConfigCommon IE.

Figure 6:
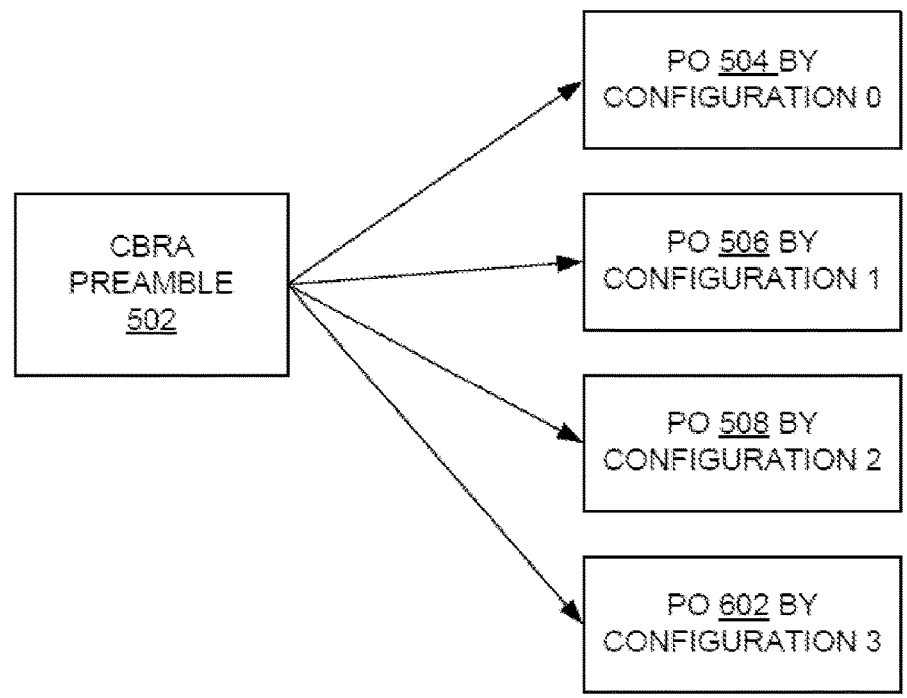
FIG. 6 illustrates an example mapping between a preamble and one or more POs, in accordance with some embodiments of the present disclosure.

FIG. 6 illustrates an example mapping 600 between a preamble and one or more POs, in accordance with some embodiments of the present disclosure. In some embodiments, the mapping 600 is same as the mapping 500 except for the differences described herein. Referring now to FIG. 6, in some embodiments, each of the one or more POs is configured by one of four configurations (e.g. the POs 504-508 are configured by the configurations 0-2, respectively, and PO 602 is configured by the configuration 3). In one embodiment, each configuration 0-3 is associated with a respective combination of the parameters included in the 2-stepRACH-ConfigCommon IE. Two of the configurations (e.g., configuration 0-1) are associated with a combination of the parameters included in the 2-stepRACH-ConfigDedicated IE (e.g. the second IE), in one embodiment.

Figure 7:
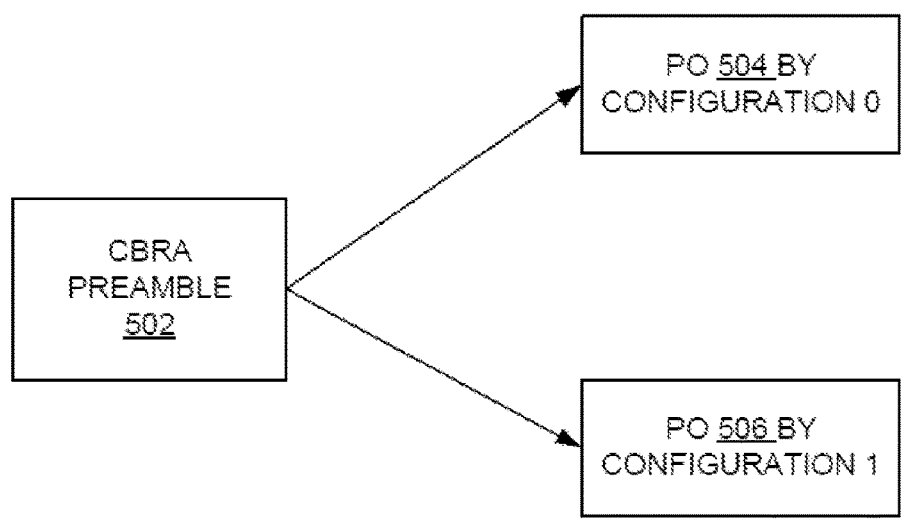
FIG. 7 illustrates an example mapping between a preamble and one or more POs, in accordance with some embodiments of the present disclosure.

FIG. 7 illustrates an example mapping 700 between a preamble and one or more POs, in accordance with some embodiments of the present disclosure. In some embodiments, the mapping 700 is same as the mapping 500 except for the differences described herein. Referring now to FIG. 7, in some embodiments, each of the one or more POs is configured by one of two configurations (e.g. the POs 504-506 are configured by the configurations 0-1, respectively). In one embodiment, each configuration 0-1 is associated with a respective combination of the parameters included in the 2-stepRACH-ConfigCommon IE. In one embodiment, one of the configurations (e.g., configuration 1) is associated with a combination of the parameters included in the 2-stepRACH-ConfigDedicated IE (e.g. the second IE).

In one embodiment, a first configuration is designed for radio resource control (RRC) idle/inactive state UE transmission and a second configuration is designed for RRC connected state UE transmission. In one embodiment, each group of POs (e.g. the POs 504-508) configured by each configuration is FDMed. In one embodiment, each group of POs configured by each configuration is time-domain aligned. For example, a plurality of resources (e.g. the POs 504-508) assigned for transmitting the one or more of msgA, or a portion thereof, is multiplexed (e.g. the POs 504-508 are multiplexed) in a frequency-domain and aligned (e.g. the POs 504-5-8 are aligned with each other) in a time-domain.

In one embodiment, the 2-stepRACH-ConfigDedicated IE contains at least one of the TBS, the MCS, the number of PRBs per PO, and the bandwidth of the PRB-level guard band. In one embodiment, the 2-stepRACH-ConfigDedicated IE contains the bandwidth of the PRB-level guard band. In one embodiment, the bandwidth of the PRB-level guard band is defined to inform a guard band between adjacent POs in the frequency-domain.

Figure 8:
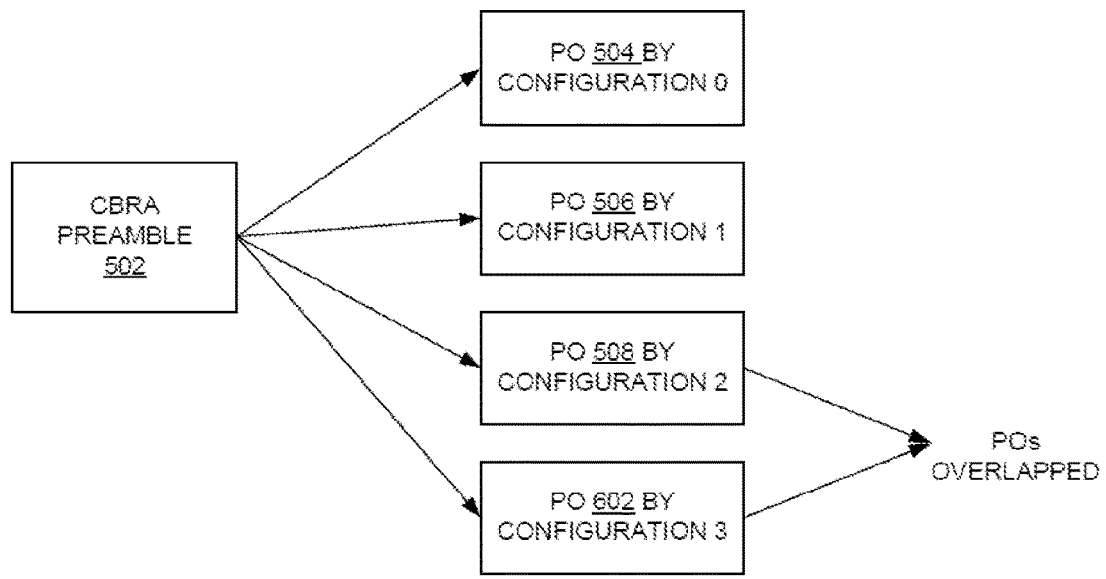
FIG. 8 illustrates an example mapping between a preamble and one or more POs, in accordance with some embodiments of the present disclosure.

FIG. 8 illustrates an example mapping 800 between a preamble and one or more POs, in accordance with some embodiments of the present disclosure. In some embodiments, the mapping 800 is same as the mapping 600 except for the differences described herein. Referring now to FIG. 8, in one embodiment, the POs 508 and 602 are totally overlapped in frequency-domain and time-domain. For example, the plurality of resources (e.g. the POs 508 and 602) assigned for transmitting the one or more of msgA, or a portion thereof, is overlapped (e.g. the POs 508 and 602 overlap each other) in both the frequency-domain and the time-domain. In some embodiments, more than two POs overlap. In some embodiments, the subset of parameters in the second information element, and/or the plurality of parameters in the first information element, is further configured to assign, map, select, or otherwise configure the plurality of resources for transmitting the one or more of msgA (e.g. that are multiplexed or overlapped) to the wireless communication node in the random access procedure.

Figure 9:
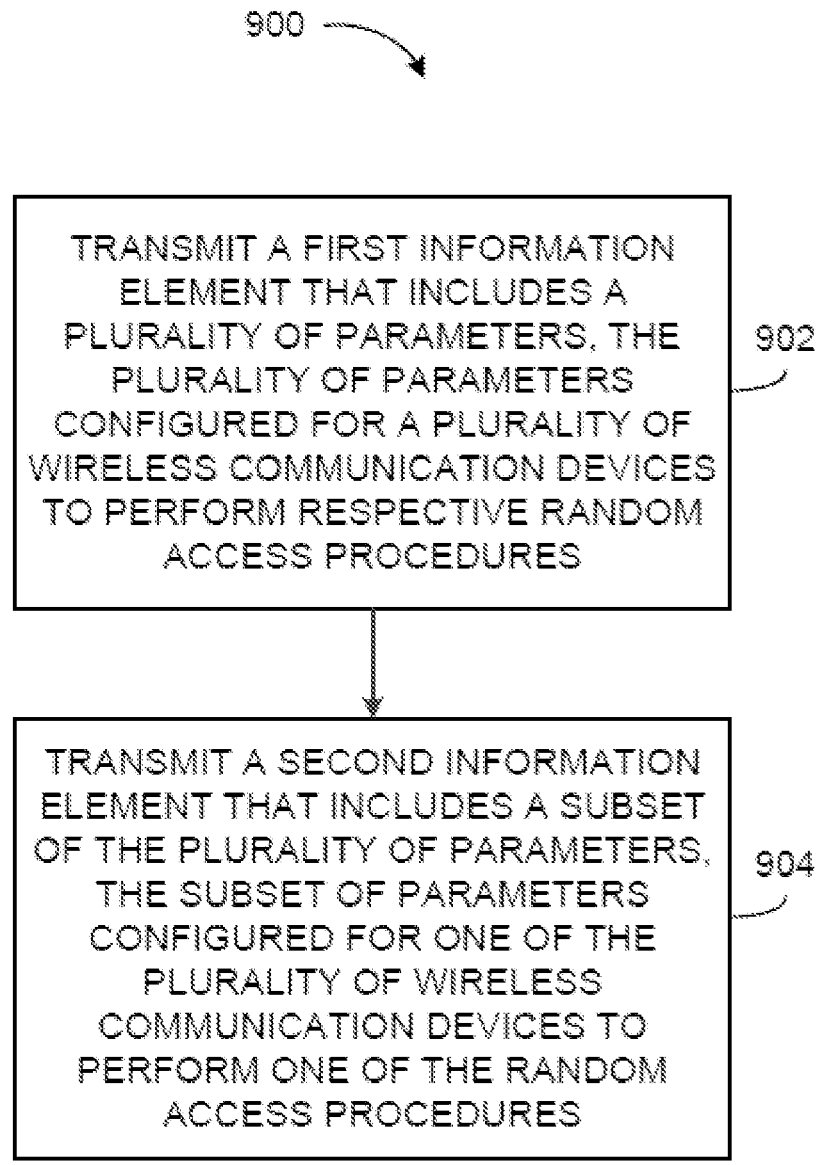
FIG. 9 is a flow diagram illustrating an example process 900 for configuring a random access procedure, in accordance with some embodiments of the present disclosure.

FIG. 9 is a flow diagram illustrating an example process 900 for configuring a random access procedure, in accordance with some embodiments of the present disclosure. In some embodiments, the process 900 can be performed by a wireless communication node (e.g., BS 302). Additional, fewer, or different operations may be performed in the process 900 depending on the embodiment. At operation 902, the wireless communication node transmits a first information element that includes a plurality of parameters. The plurality of parameters may be configured for a plurality of wireless communication devices to perform respective random access procedures. At operation 904, the wireless communication node transmits a second information element that includes a subset of the plurality of parameters. The subset of parameters may be configured for one of the plurality of wireless communication devices to perform one of the random access procedures.

In some embodiments, the random access procedure includes a 2-step random access procedure. In some embodiments, the plurality of parameters in the first information element is further commonly configured for each of the plurality of wireless communication devices to transmit one or more messages to the wireless communication node in the random access procedure. The one or more messages can include a preamble and a payload. In some embodiments, the subset of parameters in the second information element is further dedicatedly configured for the wireless communication device to transmit the one or more messages to the wireless communication node in the random access procedure.

In some embodiments, the subset of parameters in the second information element is further configured to update corresponding ones of the parameters in the first information element. In some embodiments, a communication apparatus comprising a processor is configured to implement the process 900. In some embodiments, a computer readable medium having code stored thereon, to perform the process 900.

Figure 10:
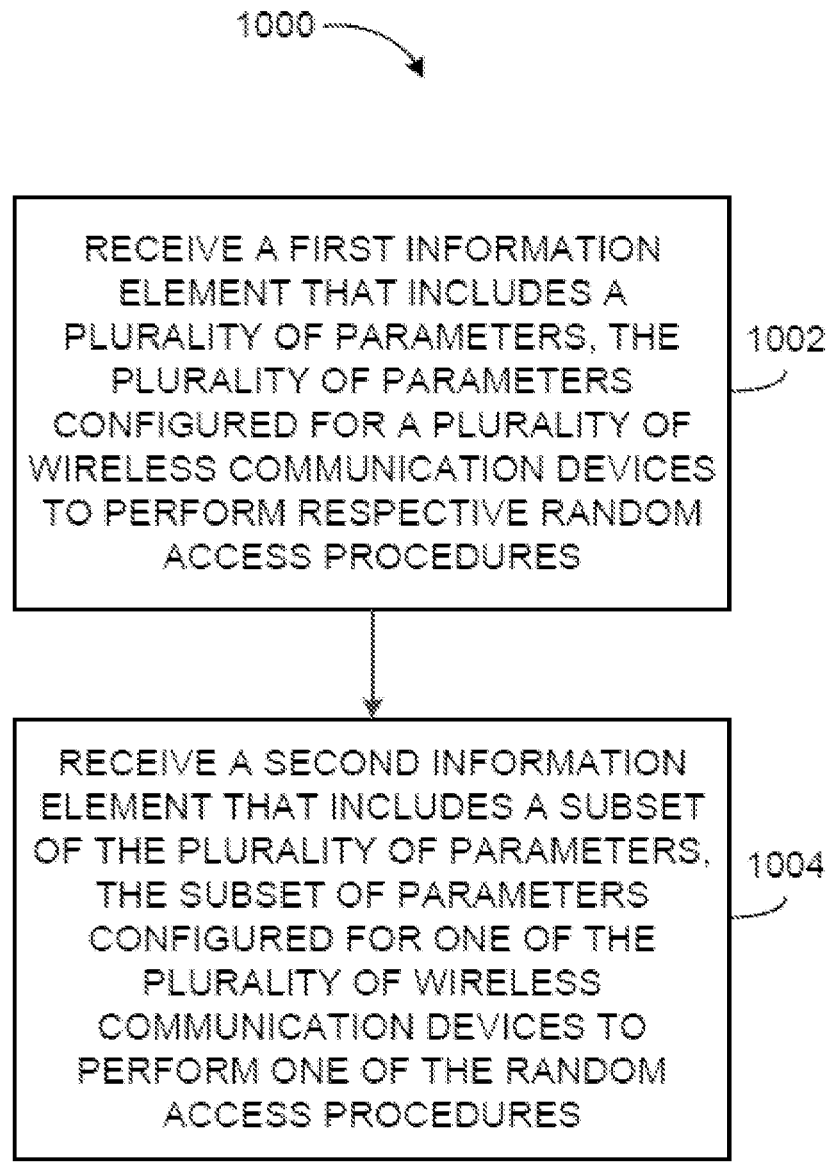
FIG. 10 is a flow diagram illustrating an example process 1000 for configuring a random access procedure, in accordance with some embodiments of the present disclosure.

FIG. 10 is a flow diagram illustrating an example process 1000 for configuring a random access procedure, in accordance with some embodiments of the present disclosure. In some embodiments, the process 1000 can be performed by a wireless communication device (e.g., UE 304). Additional, fewer, or different operations may be performed in the process 1000 depending on the embodiment. At operation 1002, the wireless communication device receives, from a wireless communication node, a first information element that includes a plurality of parameters. The plurality of parameters may be configured for a plurality of wireless communication devices to perform respective random access procedures. At operation 1004, the wireless communication device receives, from a wireless communication node, a second information element that includes a subset of the plurality of parameters. The subset of parameters may be configured for the wireless communication device to perform one of the random access procedures.

It should be understood that the value used for each case listed above is an example, and the mapping between the value and the case is not limited to the examples above. They are provided for illustrative purpose only and should not be regarded as limiting.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
    transmitting, by a wireless communication node, a first information element that includes a plurality of parameters, the plurality of parameters configured for a plurality of wireless communication devices to perform respective random access procedures; and
    transmitting, by the wireless communication node, a second information element that includes a subset of the plurality of parameters, the subset of parameters configured for a wireless communication device of the plurality of wireless communication devices to perform one of the random access procedures,
    wherein the plurality of parameters in the first information element is further commonly configured for each of the plurality of wireless communication devices to transmit one or more messages, that include a preamble and a payload, to the wireless communication node in the random access procedure, and
    wherein the subset of parameters in the second information element is further dedicatedly configured for the wireless communication device to transmit the one or more messages to the wireless communication node in the random access procedure.

2. The method of claim 1, wherein the plurality of parameters includes at least one of:
    a number of configurations;
    a modulation coding scheme (MCS);
    a transport block size (TBS);
    a physical uplink shared channel (PUSCH) mapping type;
    a number of frequency division multiplexed (FDMed) PUSCH occasions (POs);
    a number of physical resource blocks (PRBs) per PO;
    a frequency starting point;
    a number of demodulation reference signal (DMRS) symbols/ports/sequences per PO;
    a bandwidth of a PRB-level guard band or a duration of a guard time;
    a periodicity of a message A (msgA) PUSCH configuration period;
    a symbol level offset;
    a slot level offset;
    a starting symbol in a slot for a msgA transmission;
    a number of time-domain POs in the slot for the msgA transmission;
    a number of symbols per PO;
    a number of time domain multiplexed POs; or
    a redundancy version.

3. The method of claim 1, wherein the subset of parameters in the second information element includes at least one of a transport block size (TBS) or a modulation coding scheme (MCS).

4. The method of claim 1, wherein the subset of parameters in the second information element includes a number of physical resource blocks (PRBs) per physical uplink shared channel (PUSCH) occasion (PO).

5. The method of claim 1, wherein the subset of parameters in the second information element includes a bandwidth of a physical resource block (PRB)-level guard band.

6. The method of claim 1, wherein the subset of parameters in the second information element is further configured to assign a plurality of resources for the wireless communication device to transmit the one or more messages, that include the preamble and the payload, to the wireless communication node in the random access procedure, the plurality of resources is multiplexed in frequency-domain and aligned in time-domain.

7. The method of claim 1, wherein the subset of parameters in the second information element is further configured to assign a plurality of resources for the wireless communication device to transmit the one or more messages, that include the preamble and the payload, to the wireless communication node in the random access procedure, the plurality of resources is overlapped in both frequency-domain and time-domain.

8. A wireless communication node comprising:
    at least one processor and a transceiver configured to:
        transmit a first information element that includes a plurality of parameters, the plurality of parameters configured for a plurality of wireless communication devices to perform respective random access procedures; and
        transmit a second information element that includes a subset of the plurality of parameters, the subset of parameters configured for a wireless communication device of the plurality of wireless communication devices to perform one of the random access procedure,
    wherein the plurality of parameters in the first information element is further commonly configured for each of the plurality of wireless communication devices to transmit one or more messages, that include a preamble and a payload, to the wireless communication node in the random access procedure, and
    wherein the subset of parameters in the second information element is further dedicatedly configured for the wireless communication device to transmit the one or more messages to the wireless communication node in the random access procedure.

9. A wireless communication method, comprising:
    receiving, by a wireless communication device and from a wireless communication node, a first information element that includes a plurality of parameters, the plurality of parameters configured for a plurality of wireless communication devices to perform respective random access procedures; and
    receiving, by the wireless communication device and from the wireless communication node, a second information element that includes a subset of the plurality of parameters, the subset of parameters configured for the wireless communication device to perform one of the random access procedures,
    wherein the plurality of parameters in the first information element is further commonly configured for each of the plurality of wireless communication devices to transmit one or more messages, that include a preamble and a payload, to the wireless communication node in the random access procedure, and
    wherein the subset of parameters in the second information element is further dedicatedly configured for the wireless communication device to transmit the one or more messages to the wireless communication node in the random access procedure.

10. The method of claim 9, wherein the plurality of parameters includes at least one of:
a number of configurations;
a modulation coding scheme (MCS);
a transport block size (TBS);
a physical uplink shared channel (PUSCH) mapping type;
a number of frequency division multiplexed (FDMed) PUSCH occasions (POs);
a number of physical resource blocks (PRBs) per PO;
a frequency starting point;
a number of demodulation reference signal (DMRS) symbols/ports/sequences per PO;
a bandwidth of a PRB-level guard band or a duration of a guard time;
a periodicity of a message A (msgA) PUSCH configuration period;
a symbol level offset;
a slot level offset;
a starting symbol in a slot for a msgA transmission;
a number of time-domain POs in the slot for the msgA transmission;
a number of symbols per PO;
a number of time domain multiplexed POs; or
a redundancy version.

11. The method of claim 9, wherein the subset of parameters in the second information element includes at least one of a transport block size (TBS) or a modulation coding scheme (MCS).

12. The method of claim 9, wherein the subset of parameters in the second information element includes a number of physical resource blocks (PRBs) per physical uplink shared channel (PUSCH) occasion (PO).

13. The method of claim 9, wherein the subset of parameters in the second information element includes a bandwidth of a physical resource block (PRB)-level guard band.

14. The method of claim 9, wherein the subset of parameters in the second information element is further configured to assign a plurality of resources for the wireless communication device to transmit the one or more messages, that include the preamble and the payload, to the wireless communication node in the random access procedure, the plurality of resources is multiplexed in frequency-domain and aligned in time-domain.

* * * * *